US010723292B2

(12) United States Patent
Hagi

(10) Patent No.: US 10,723,292 B2
(45) Date of Patent: Jul. 28, 2020

(54) VEHICULAR HIGH-VOLTAGE WIRE AND WIRE HARNESS

(71) Applicant: SUMITOMO WIRING SYSTEMS, LIMITED, Yokkaichi-shi, Mie (JP)

(72) Inventor: Masahiro Hagi, Yokkaichi (JP)

(73) Assignee: SUMITOMO WIRING SYSTEMS, LIMITED, Mie (JP)

(*) Notice: Subject to any disclaimer, the term of this patent is extended or adjusted under 35 U.S.C. 154(b) by 0 days.

(21) Appl. No.: 16/465,858

(22) PCT Filed: Dec. 5, 2017

(86) PCT No.: PCT/JP2017/043571
§ 371 (c)(1),
(2) Date: May 31, 2019

(87) PCT Pub. No.: WO2018/116807
PCT Pub. Date: Jun. 28, 2018

(65) Prior Publication Data
US 2019/0299885 A1 Oct. 3, 2019

(30) Foreign Application Priority Data

Dec. 19, 2016 (JP) .................. 2016-245805

(51) Int. Cl.
H01B 7/00 (2006.01)
H01B 7/18 (2006.01)
(Continued)

(52) U.S. Cl.
CPC ........... B60R 16/0215 (2013.01); H01B 7/00 (2013.01); H01B 7/18 (2013.01); H02M 7/48 (2013.01)

(58) Field of Classification Search
CPC ............ H01B 11/1895; H01B 11/1878; H01B 13/016; H01B 11/1813; H01B 11/18; Y10T 29/49123; B60R 16/0215; H02M 7/48
(Continued)

(56) References Cited

U.S. PATENT DOCUMENTS 4,567,917 A * 2/1986 Millard ............... B29C 53/68
138/126
5,414,211 A * 5/1995 Chan ................... H01B 7/2806
156/51
(Continued)

FOREIGN PATENT DOCUMENTS

JP H08-315645 A 11/1996
JP H11-086642 A 3/1999
(Continued)

OTHER PUBLICATIONS

Feb. 27, 2018 Search Report issued in International Patent Application No. PCT/JP2017/043571.

Primary Examiner — Timothy J Thompson
Assistant Examiner — Michael G McAllister
(74) Attorney, Agent, or Firm — Oliff PLC

(57) ABSTRACT

A vehicular high-voltage wire to be electrically connected to an in-vehicle high-voltage battery, the vehicular high-voltage wire including a core wire that is formed of a conductor and is to be electrically connected to the high-voltage battery, an insulating covering that covers an outer circumference of the core wire, and a cylindrical cover that covers an outer circumference of the insulating covering, wherein: the core wire, the insulating covering and the cylindrical cover are coaxially provided, and the cylindrical cover is formed by weaving a plurality of strands including a first strand formed of a conductor and a second strand formed of
(Continued)

a reinforced fiber having insulation properties with a higher strength than the first strand.

9 Claims, 2 Drawing Sheets

(51) Int. Cl.
*H02M 7/48* (2007.01)
*B60R 16/02* (2006.01)
(58) Field of Classification Search
USPC .......................................................... 174/72 A
See application file for complete search history.

(56) References Cited

U.S. PATENT DOCUMENTS

| | | | | |
|---|---|---|---|---|
| 5,475,185 | A * | 12/1995 | Tokarsky | H01B 11/1813 174/107 |
| 2003/0221736 | A1 * | 12/2003 | Laurent | F16L 59/021 138/123 |
| 2011/0244747 | A1 * | 10/2011 | Ushikai | H02G 3/0481 442/302 |
| 2012/0103651 | A1 * | 5/2012 | Kim | H01B 11/1808 174/102 R |
| 2014/0166334 | A1 * | 6/2014 | Marchisio | H01B 11/1813 174/106 R |
| 2015/0194795 | A1 * | 7/2015 | Rohr | H02G 3/0406 174/72 A |
| 2017/0129424 | A1 | 5/2017 | Nagahashi et al. | |
| 2018/0082768 | A1 * | 3/2018 | Marchisio | H01B 13/016 |
| 2018/0220558 | A1 * | 8/2018 | Simoens | H05K 9/009 |
| 2019/0273199 | A1 * | 9/2019 | Tajitsu | D04B 21/16 |

FOREIGN PATENT DOCUMENTS

| | | |
|---|---|---|
| JP | 2006-164830 A | 6/2006 |
| JP | 2010-073636 A | 4/2010 |
| JP | 2016-63557 A | 4/2016 |

* cited by examiner

VEHICULAR HIGH-VOLTAGE WIRE AND WIRE HARNESS

This application is the U.S. National Phase of PCT/JP2017/043571 filed Dec. 5, 2017, which claims priority from JP 2016-245805 filed Dec. 19, 2016, the entire disclosure of which is incorporated herein by reference.

BACKGROUND

The present disclosure relates to a vehicular high-voltage wire and a wire harness.

Conventionally, as shown in JP 2016-63557A for example, a vehicle such as a hybrid car or an electric automobile includes a motor serving as a power source for propelling the vehicle, an inverter connected to the motor, and a high-voltage battery that supplies electrical power to the inverter. The inverter and the high-voltage battery are connected to each other by a wire harness that includes two high-voltage wires, namely a positive and a negative high-voltage wire.

SUMMARY

Regarding these high-voltage wires that are electrically connected to the in-vehicle high-voltage battery, the inventor of the present disclosure has studied compatibility between shock resistance performance at the time of a vehicle collision and the like, and shielding performance for preventing noise radiation from the electric wire to the outside and intrusion of noise from the outside.

An exemplary aspect of the disclosure provides a vehicular high-voltage wire and a wire harness that can improve shock resistance and shielding property.

A vehicular high-voltage wire to be electrically connected to an in-vehicle high-voltage battery includes a core wire that is formed of a conductor and is to be electrically connected to the high-voltage battery, an insulating covering that covers an outer circumference of the core wire, and a cylindrical cover that covers an outer circumference of the insulating covering, wherein: the core wire, the insulating covering and the cylindrical cover are coaxially provided, and the cylindrical cover is formed by weaving a plurality of strands including a first strand formed of a conductor and a second strand formed of a reinforced fiber having insulation properties with a higher strength than the first strand.

With this configuration, the insulating covering of the high-voltage wire is covered with the cylindrical cover formed by the first strand formed of a conductor and the second strand formed of reinforced fibers, and thus the shock resistance and the shielding property of the high-voltage wire can be improved.

In the above vehicular high-voltage wire, the second strand may be formed of aramid fibers.

With this configuration, because the second strand forming the cylindrical cover is formed of aramid fibers, the shock resistance of the high-voltage wire can be suitably improved.

In the above vehicular high-voltage wire, the first strand may be formed of a copper wire.

With this configuration, because the first strand forming the cylindrical cover is formed of a copper wire, the shielding property of the high-voltage wire can be suitably ensured.

In the above vehicular high-voltage wire, the first strand may be formed of an aluminum wire.

With this configuration, because the first strand forming the cylindrical cover is formed of an aluminum wire, the shielding property of the high-voltage wire can be suitably ensured.

A wire harness that solves the foregoing issue includes the above-mentioned vehicular high-voltage wire.

With this configuration, the shock resistance and the shielding property of the high-voltage wire of the wire harness can be improved.

With the vehicular high-voltage wire and the wire harness according to some embodiments of the present disclosure, the shock resistance and the shielding property can be improved. Other features and advantages of the present disclosure will be apparent from the following description taken in conjunction with the drawings showing examples of the technical concept of the present disclosure.

DETAILED DESCRIPTION OF EMBODIMENTS

Figure 1:
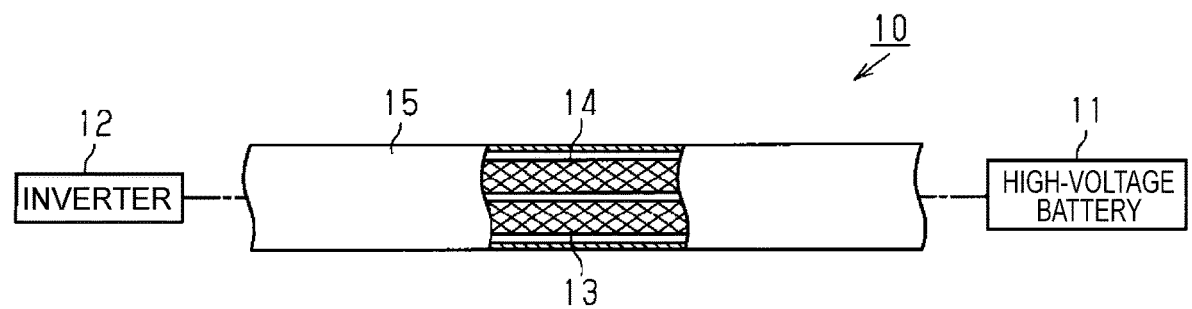
FIG. 1 is a schematic configuration diagram of a wire harness according to an embodiment.

Hereinafter, one embodiment of a vehicular high-voltage wire and a wire harness will be described with reference to FIGS. 1 to 3. Note, that portions of configurations may be shown in an exaggerated or simplified manner in the drawings in order to facilitate their description. The proportions of portions may also differ from actual proportions.

As shown in FIG. 1, in a hybrid car or an electric automobile, the wire harness 10 according to the present embodiment is routed under the floor or the like of a vehicle, for example, in order to connect a high-voltage battery 11 installed at the rear of the vehicle and an inverter 12 installed at the front of the vehicle. The inverter 12 is connected to a wheel driving motor (not shown) serving as a power source for driving the vehicle, generates AC (alternating current) power from DC (direct current) power of the high-voltage battery 11, and supplies the generated AC power to the motor. The high-voltage battery 11 is a battery that can supply a voltage of several hundred volts.

The wire harness 10 includes a positive high-voltage wire 13 and a negative high-voltage wire 14 respectively connected to a plus terminal and a minus terminal of the high-voltage battery 11, and an external material 15 collectively enclosing the high-voltage wires 13 and 14. The high-voltage wires 13 and 14 are electric wires capable of coping with a high voltage and a large electric current. The ends on one side of the high-voltage wires 13 and 14 are connected to the high-voltage battery 11 and the other ends are connected to the inverter 12. Note, that a corrugated tube or the like can be used as the external material 15.

Figure 2:
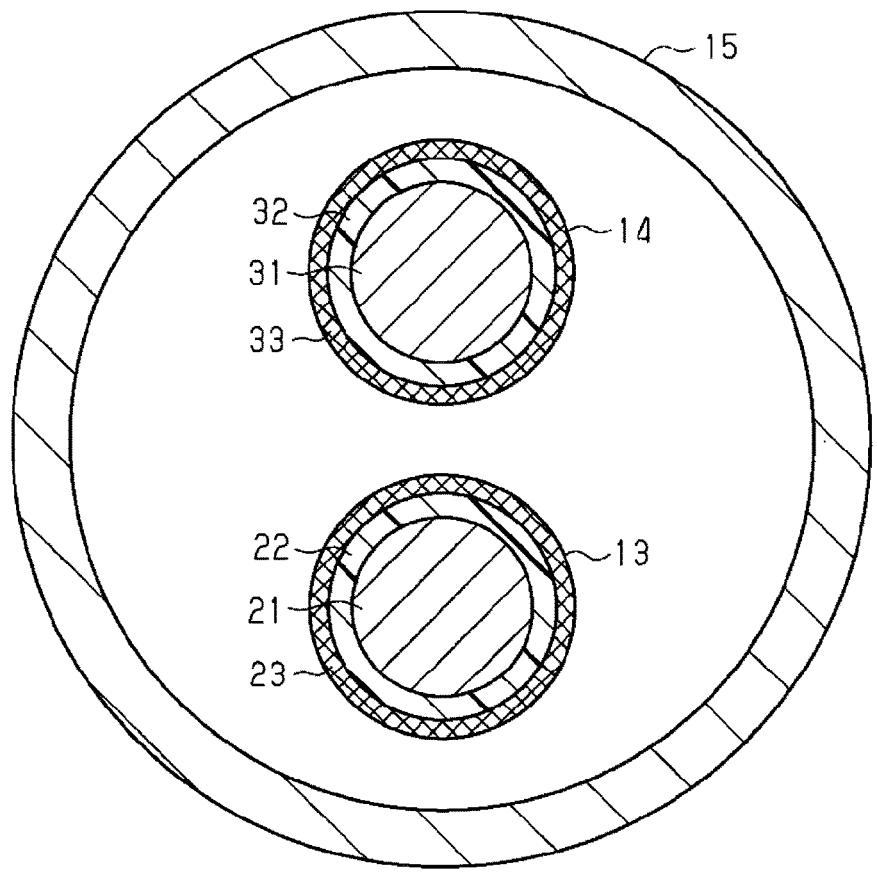
FIG. 2 is a cross-sectional view of the wire harness of the embodiment.
Figure 3:
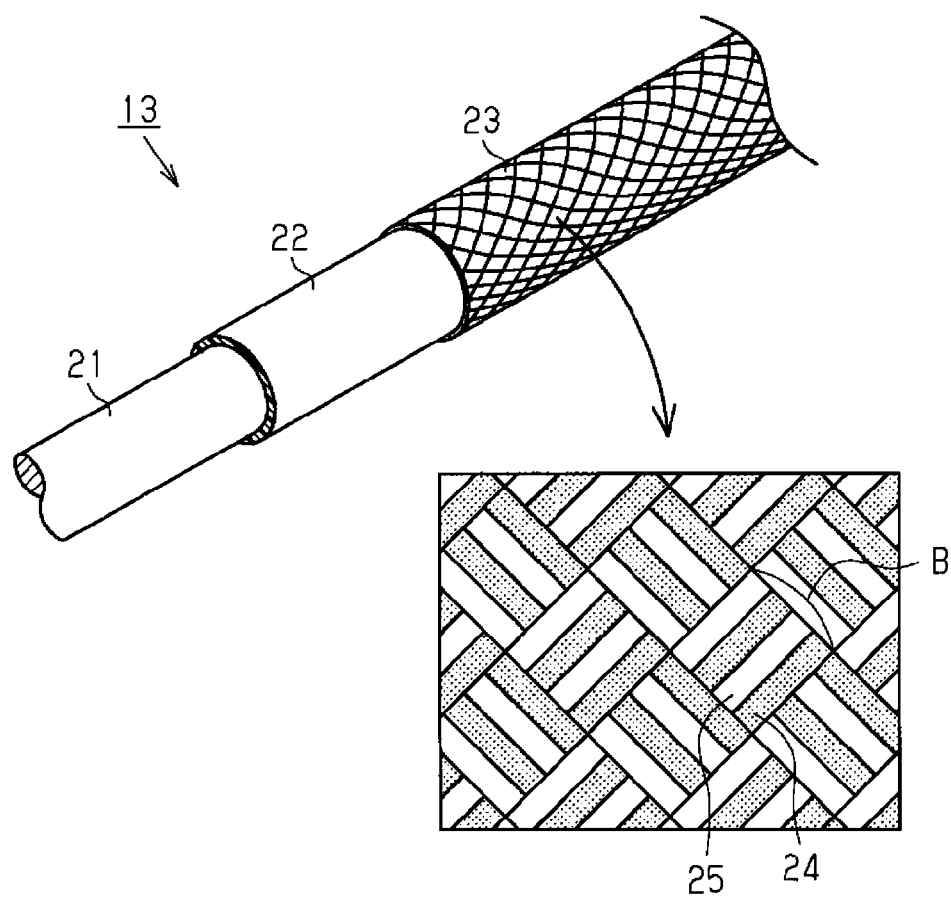
FIG. 3 is a schematic configuration diagram of a positive high-voltage wire of the embodiment.

As shown in FIGS. 2 and 3, the positive high-voltage wire 13 has a structure in which a core wire 21, which is formed of a conductor, an insulating covering 22, which covers the outer circumference of the core wire 21, and a cylindrical protective member 23 (cylindrical cover), which covers the outer circumference of the insulating covering 22, are coaxially provided.

The insulating covering 22 is formed of a resin material. The insulating covering 22 is formed by extrusion covering the outer circumferential surface of the core wire 21, and covers the outer circumferential surface of the core wire 21 in a close contact state. The protective member 23 has a cylindrical shape, and covers the outer circumference of the insulating covering 22. The protective member 23 is configured as a braided body in which a plurality of strands are woven, and has flexibility. Note, that the protective member 23 has a length substantially covering the entire length of the insulating covering 22. Also, both end portions of the protective member 23 are fixed to the insulating covering 22 by being wrapped with an adhesive tape.

As shown in FIG. 3, a plurality of strands constituting the protective member 23 include a first strand (bare wire) 24 that is formed of an annealed copper wire plated with tin, and a second strand (bare wire) 25 that is formed of reinforced fibers having better insulating properties and shearing resistance than the first strand 24.

Examples of the reinforced fibers that constitute the second strand 25 include para-aramid fiber, polyarylate fiber, PBO (polyparaphenylene benzobisoxazole) fiber, PET (polyethylene terephthalate) fiber, ultrahigh molecular weight polyethylene fiber, PEI (polyether imide) fiber, glass fiber, and ceramic fiber, and it is preferable that one or more of these types is used in accordance with the physical properties required of the protective member 23. In the present embodiment, the second strand 25 is constituted by one of the above types, namely para-aramid fiber.

The protective member 23 according to the present embodiment includes a plurality of strand bundles B. Each of the strand bundles B is constituted by two strands, namely a first strand 24 and a second strand 25. The protective member 23 is constituted by weaving a plurality of strand bundles B in a lattice shape. That is to say, the number of strands (the number of strands in the strand bundle B) of the protective member 23 of the present embodiment is four, and the mixing ratio of the first strand 24 and the second strand 25 is 1:1. Also, in each of the strand bundles B, the first strand 24 and the second strand 25 are alternately arranged. In the example of FIG. 3, the first strand 24 and the second strand 25 form a stripe pattern, and two types of strand bundles having different stripe patterns form a checker flag pattern. The axes of the strands in each strand bundles B may be nonparallel to the axis of the core wire 21. It is preferable that each strand bundle B and each strand have an inclination angle with respect to the axis of the core wire 21. Each strand bundle B may extend in a spiral shape along the axis of the core wire 21, for example. In the example of FIG. 3, two types of strand bundles B having different stripe patterns respectively extend in a clockwise spiral shape and a counterclockwise spiral shape along the axis of the core wire 21.

As shown in FIG. 2, the negative high-voltage wire 14 has the same configuration (a core wire 31, an insulating covering 32, and a protective member 33) as the positive high-voltage wire 13. The configurations of the core wire 31, the insulating covering 32, and the protective member 33 of the negative high-voltage wire 14 are respectively same as the configurations of the core wire 21, the insulating covering 22, and the protective member 33 of the positive high-voltage wire 13, and thus the detailed description thereof will be omitted.

Next, effects of the present embodiment will be described.

(1) Each of the protective members 23 and 33 of the high-voltage wire 13 and 14 is configured by weaving a first strand 24 formed of a conductor and a second strand 25 formed of reinforced fibers having insulation properties and higher strength than the first strand 24. Accordingly, it is possible to improve the shock resistance by the second strand 25 formed of reinforced fibers, and also to improve the shielding property by the first strand 24 formed of a conductor.

(2) By using aramid fibers as the reinforced fibers constituting the second strand 25, it is possible to suitably improve the shock resistance of the high-voltage wires 13 and 14.

(3) By using a copper wire as a conductor constituting the first strand 24, it is possible to suitably ensure the shielding property of the high-voltage wires 13 and 14.

Note, that the above embodiment may also be modified as follows.

In the above embodiment, the mixing ratio of the first strand 24 and the second strand 25 in the strand bundle B is 1:1, but the mixing ratio is not particularly limited to this. The mixing ratio can be changed as appropriate depending on the configuration. Also, the strand bundle B may also be configured to include a strand formed of a material other than the first strand 24 and the second strand 25.

In the above embodiment, the first strand 24 and the second strand 25 in the strand bundle B are alternately arranged, but the arrangement is not limited to this.

In the above embodiment, the number of strands in the strand bundle B is four, but the number of strands is not limited to this. The number of strands may also be less than four, or more than or equal to five.

Figure 4:
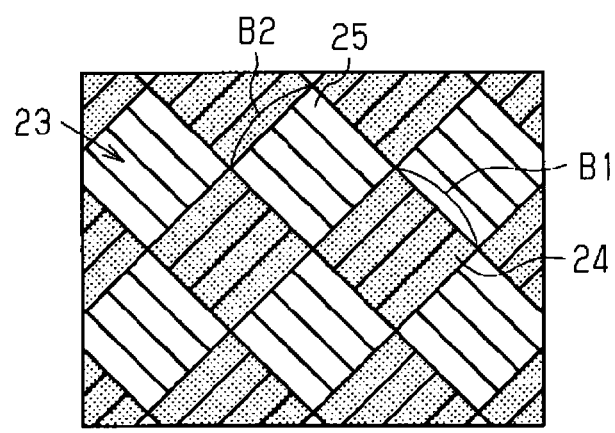
FIG. 4 is a schematic view showing a weaving structure of a protective member of a positive high-voltage wire in a variation.

In the above embodiment, each strand bundle B constituting the protective member 23 (the protective member 33) includes the first strand 24 and the second strand 25, but the configuration is not particularly limited to this. As shown in FIG. 4, for example, using a first strand bundle B1 constituted only by a plurality of the first strands 24 and a second strand bundle B2 constituted only by a plurality of the second strands 25, the protective members may also be formed by weaving the first strand bundle B1 and the second strand bundle B2 in a lattice pattern so that they cross each other. In the example shown in FIG. 4, the first strand bundle B1 and the second strand bundle B2 form a checker flag pattern.

In the above embodiment, the first strand 24 is formed of an annealed copper wire, but the material of the first strand 24 may also be changed to an aluminum wire, an iron wire, a stainless steel wire, or the like, for example.

In the above embodiment, the positive high-voltage wire 13 and the negative high-voltage wire 14 respectively include the protective member 23 and 33, but a configuration may also be adopted in which only one of the high-voltage wires has the protective member. Note, that in this case, it is preferable to provide a shielding function to the external material 15, by providing a shielding covering formed of a woven metal or the like on the high-voltage wire that includes no protective member, or by constituting the external material 15 with a conductor such as a metal pipe, a woven metal, or the like.

In the above embodiment, a covering member such as a resin tube (e.g., polyethylene) that covers the outer circumference of the protective members 23 and 33 may also be provided on at least one of the positive high-voltage wire 13 and the negative high-voltage wire 14 entirely or partially in the longitudinal direction of the protective members 23 and 33.

In the wire harness 10 of the above embodiment, a configuration is adopted in which two electrical wires, namely the positive high-voltage wire 13 and the negative high-voltage wire 14, are inserted through the external material 15, but the configuration of the electric wires inserted through the external material 15 may also be changed as appropriate depending on the vehicle configuration. A configuration may also be adopted in which low-voltage wires, which connect a low-voltage battery and various low-voltage devices (e.g., a lamp, a car audio, and the like), are added as electric wires inserted through the external material 15.

The arrangement relationship between the high-voltage battery 11 and the inverter 12 in the vehicle is not limited to the arrangement relationship in the above embodiment. The relationship may also be changed as appropriate depending on the vehicle configuration. Also, in the above embodiment, the high-voltage battery 11 is connected to the inverter 12 via the high-voltage wires 13 and 14, but a configuration may also be adopted in which the high-voltage battery 11 is connected to a high-voltage device other than the inverter 12.

The above embodiment and variations may also be combined as appropriate.

It will be apparent to those skilled in the art that the present disclosure may also be embodied in other specific forms without departing from the technical concept of the disclosure. The components described in the embodiment above (or one or more aspects thereof) may also be partly omitted, or combined, for example.

The invention claimed is:

1. A vehicular high-voltage wire comprising:
a core wire that is a conductor and is configured to be electrically connected to an in-vehicle high-voltage battery;
an insulating covering that covers an outer circumference of the core wire; and
a cylindrical cover that covers an outer circumference of the insulating covering, the cylindrical cover comprising a woven plurality of strands including a first strand that is a conductor and a second strand that is a reinforced fiber insulator and has a higher strength than the first strand,
wherein the core wire, the insulating covering, and the cylindrical cover are coaxial, and
the vehicular high-voltage wire is configured to be electrically connected to the in-vehicle high-voltage battery.

2. The vehicular high-voltage wire according to claim 1, wherein the second strand comprises aramid fibers.

3. The vehicular high-voltage wire according to claim 1, wherein the first strand is a copper wire.

4. The vehicular high-voltage wire according to claim 1, wherein the first strand is an aluminum wire.

5. The vehicular high-voltage wire according claim 1, wherein a first end of the vehicular high-voltage wire is configured to be connected to the in -vehicle high-voltage battery, and a second end of the vehicular high-voltage wire is configured to be connected to an inverter.

6. A wire harness comprising:
the vehicular high-voltage wire according to claim 1.

7. The wire harness according to claim 6, wherein the wire harness is configured to be routed under a floor of a vehicle containing the in-vehicle high -voltage battery.

8. The vehicular high-voltage wire according claim 1, further comprising:
a plurality of the first strand;
a plurality of the second strand;
a first bundle of the plurality of the first strand that contains no second strands; and
a second bundle of the plurality of the second strand that contains no first strands,
wherein the cylindrical cover comprises the first bundle and the second bundle woven together in a checker flag pattern.

9. The vehicular high-voltage wire according claim 1, further comprising:
a plurality of the first strand;
a plurality of the second strand;
a first bundle including one of the plurality of the first strand and one of the plurality of the second strand; and
a second bundle including one of the plurality of the first strand and one of the plurality of the second strand,
wherein the cylindrical cover comprises the first bundle and the second bundle woven together in a checker flag pattern.

* * * * *